(12) United States Patent
Harvey et al.

(10) Patent No.: US 6,496,640 B1
(45) Date of Patent: Dec. 17, 2002

(54) SPLICE CLOSURE WITH REMOVABLE AND PIVOTABLE SPLICE TRAYS, AND ASSOCIATED METHODS

(75) Inventors: John D. Harvey, Trophy Club; Kelly J. Smith, Aledo; James H. Wicker, Arlington, all of TX (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 09/464,962

(22) Filed: Dec. 16, 1999

(51) Int. Cl.[7] .................................................. G02B 6/00
(52) U.S. Cl. .................................... 385/135; 385/137
(58) Field of Search ................................. 385/134, 135, 385/136, 137

(56) References Cited

U.S. PATENT DOCUMENTS

| | | | |
|---|---|---|---|
| 4,911,521 A | * | 3/1990 | Ryuto et al. ............... 385/135 |
| 4,913,522 A | | 4/1990 | Nolf et al. |
| 4,927,227 A | * | 5/1990 | Bensel, III et al. ......... 385/135 |
| 5,071,220 A | | 12/1991 | Ruello et al. |
| 5,115,489 A | | 5/1992 | Norris |
| 5,131,066 A | | 7/1992 | Foss |
| 5,185,845 A | | 2/1993 | Jones |
| 5,222,183 A | * | 6/1993 | Daems et al. ............... 385/135 |
| 5,222,184 A | | 6/1993 | Foss |
| 5,323,480 A | | 6/1994 | Mullaney et al. |
| 5,396,575 A | | 3/1995 | Hayward et al. |
| 5,440,666 A | | 8/1995 | Burek et al. |
| 5,472,160 A | | 12/1995 | Burek et al. |
| 5,479,553 A | | 12/1995 | Daems et al. |
| 5,481,639 A | * | 1/1996 | Cobb et al. .................. 385/135 |
| 5,495,549 A | | 2/1996 | Schneider et al. |
| 5,519,804 A | | 5/1996 | Burek et al. |
| 5,602,954 A | | 2/1997 | Nolf et al. |
| 5,619,608 A | | 4/1997 | Foss et al. |
| 5,692,299 A | | 12/1997 | Daems et al. |
| 5,768,463 A | | 6/1998 | Foss et al. |
| 5,835,657 A | | 11/1998 | Suarez et al. |
| 5,862,290 A | | 1/1999 | Burek et al. |
| 6,249,633 B1 | * | 6/2001 | Wittmeier, II et al. ...... 385/135 |

OTHER PUBLICATIONS

Typical Properties RADEL R Polyphenylsulfone [online], [retrieved on Mar. 17, 1999]. Retrieved from the Internet <URL: http://www.amocochem.com/pdf/imrrus.htm>.*
Typical Properties UDEL Polyphenylsulfone [online], [retrieved on Mar. 17, 1999]. Retrieved from Internet <URL: http://www.amocochem.com/pdf/imrrus.htm>.*
RADEL R Polyphenylsulfone [online], [retrieved on Mar. 17, 1999]. Retrieved from the Internet <URL:wysiwgy://body.61/http://www.amocochem.com/products/radel/radelr.htm>.*
IDES Prospector Data sheet, GE Plastics, Feb. 18, 1999.*
Five individual photographs of a Hellermann Cabletyte Closure (5 sheets).
Tyton Hellermann Corp., TYT FAN27–48C, 27 Port Closure W/48 Trays, Clok, Fiber Access Node (FAN) (2 sheeets).
SIECOR Metal Splice Trays; Siecor Recommended Procedure; SRP–001–274; Issue 3, Jan. 1998; pp. 1–4.

* cited by examiner

Primary Examiner—Cassandra Spyrou
Assistant Examiner—Euncha Cherry

(57) ABSTRACT

A splice closure contains multiple splice trays that can be individually pivoted and accessed so that the splice closure is capable of optimally carrying and providing access to numerous optical fibers and optical fiber splices. The splice closure has a housing defining an internal cavity and at least one opening to the internal cavity. An end cap is capable of occluding the opening of the housing to provide an enclosed configuration. A support frame has opposite front and rear ends, the front end of the support frame is connected to the end cap, and the support frame is capable of being positioned within the internal cavity of the housing during the enclosed configuration. The support frame extends in a longitudinal direction between the front and rear ends, and defines a frame axis that extends in the longitudinal direction. The multiple splice trays are pivotally carried by the support frame so that there are a plurality of axes of rotation that are generally parallel to the frame axis and about which the splice trays are respectively pivotable. Biasing mechanisms are operative for releasably holding the splice trays to the support frame.

24 Claims, 11 Drawing Sheets

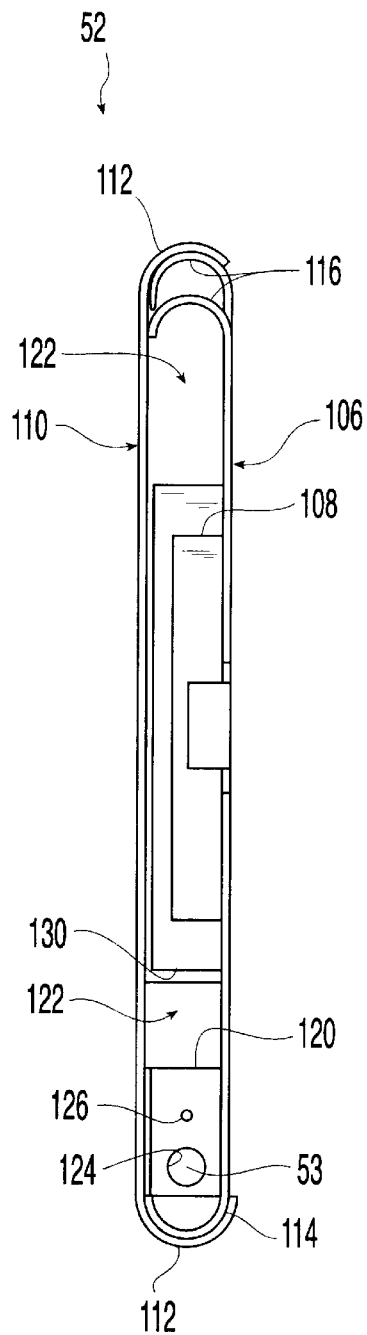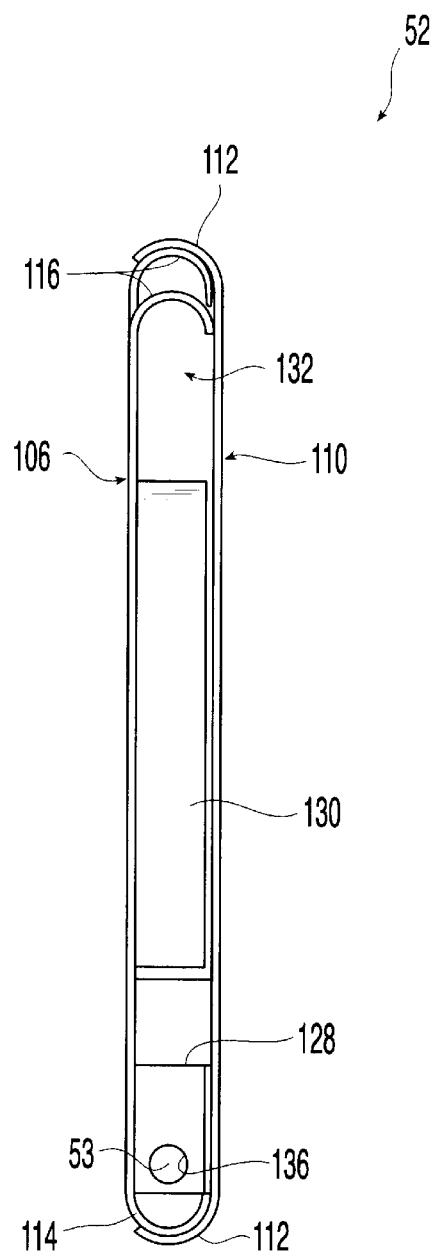
Fig. 6
Fig. 8

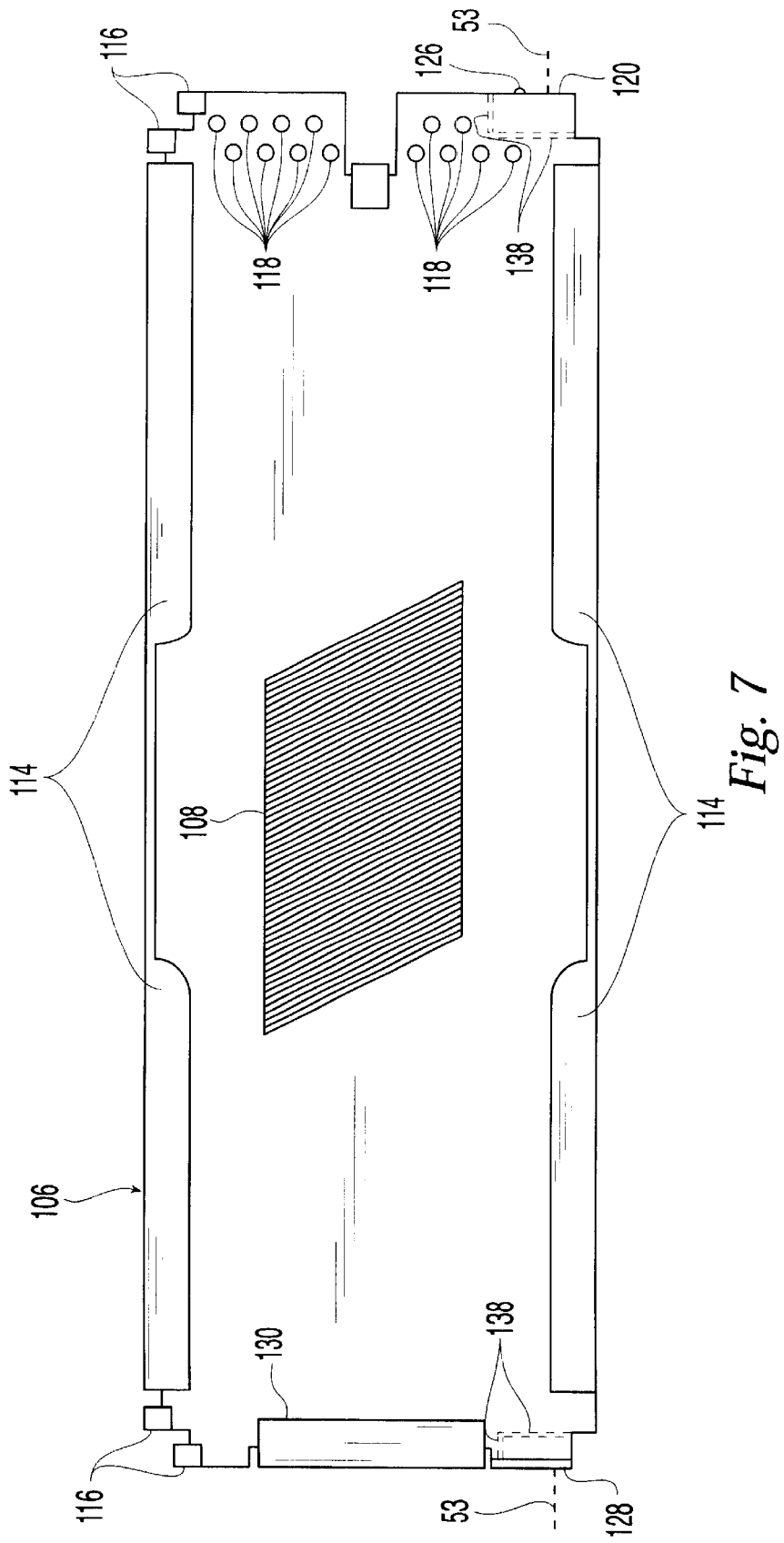

SPLICE CLOSURE WITH REMOVABLE AND PIVOTABLE SPLICE TRAYS, AND ASSOCIATED METHODS

FIELD OF THE INVENTION

The present invention relates generally to optical fiber interconnection closures and, more particularly, to splice closures with removable and pivotable splice trays.

BACKGROUND OF THE INVENTION

Fiber optic networks typically include interconnection closures at various splice locations throughout the fiber optic network. Typically, these interconnection closures include splice closures and patch closures. For example, splice closures commonly house the splices connecting the optical fibers of one or more distribution cables to respective ones of the optical fibers of a fiber optic feeder cable. By housing the splices, a splice closure protects the spliced end portions of the optical fibers from environmental degradation, strain, and other deleterious forces, thereby increasing the reliability and quality of the splices.

A variety of splice closures have been designed. For example, a typical butt-type splice closure includes a housing open at one end and a single end cap positioned within the open end of the housing. Each of the fiber optic cables associated with the butt-type splice closure extends through the single end cap. As an additional example, a typical in-line splice closure includes a housing open at both of its opposite ends and a pair of end caps respectively positioned within the open ends of the housing so fiber optic cables can enter the in-line splice closure from either end of the housing.

Conventional splice closures of the above-described types generally include a frame that is connected to the end cap(s) and carries a number of splice trays that are disposed in a stacked arrangement within the housing. Each splice tray includes one or more splice organizers for receiving the spliced end portions of optical fibers.

As optical fibers continue to be used in greater numbers, the demand increases for splice closures that can carry and provide access to numerous optical fibers and optical fiber splices. Whereas some conventional splice closures can be characterized as sufficiently carrying and providing access to numerous optical fibers and optical fiber splices, there is always a demand for new splice closure structures that enhance the capability for optimally carrying and providing access to large numbers of optical fibers and optical fiber splices.

SUMMARY OF THE INVENTION

The present invention provides splice closures and components of splice closures that enhance the capability for optimally carrying and providing access to large numbers of optical fibers and optical fiber splices. More specifically, in accordance with one aspect of the present invention, a splice closure contains multiple splice trays that can be individually pivoted and accessed. The splice closure has a housing defining an internal cavity and at least one opening to the internal cavity. An end cap is capable of occluding the opening of the housing to provide an enclosed configuration. A support frame has opposite front and rear ends, and the front end of the support frame is connected to the end cap so that the support frame is capable of being positioned within the internal cavity of the housing during the enclosed configuration. The support frame extends in a longitudinal direction between the front and rear ends, and defines a frame axis that extends in the longitudinal direction. Multiple splice trays that are capable of supporting optical fiber splices are carried by the support frame. Each splice tray is mounted to be capable of pivoting relative to the support frame. More specifically, there are a plurality of axes of rotation that are generally parallel to the frame axis and about which the splice trays are respectively pivotable.

In accordance with another aspect of the present invention, for a representative splice tray, a front end of the splice tray is carried by a front pivot that is carried by the support frame, and a rear end of the splice tray is carried by a rear pivot that is carried by the support frame. In accordance with one aspect of the present invention, a biasing mechanism is operative to hold the splice tray to the support frame. The splice tray can be removed from the support frame by manually overcoming the force exerted by the biasing mechanism. Likewise, the splice tray can be installed to the support frame by manually overcoming the force exerted by the biasing mechanism. The biasing mechanism can be part of an active pivot, one or more components of a fiber optic cable, such as buffer tubes, or the like.

In accordance with another aspect of the present invention, pivots that are pivotally carrying adjacent splice trays are arranged so external surfaces of adjacent splice trays cooperate to define a cascade-like configuration. The cascade-like configuration at least partially facilitates the individual pivoting of at least some of the splice trays. In accordance with another aspect of the present invention, restricting mechanisms are provided for limiting the pivoting of the splice trays pivotally carried by the support frame.

In accordance with another aspect of the present invention, a first group of the splice trays is spaced apart from a second group of the slice trays in a lateral direction so a space is defined between the first and second groups of splice trays. The space between the groups of splice trays is capable of receiving and storing excess portions of the buffer tubes.

The splice closures of the present invention advantageously contain multiple splice trays that can be individually pivoted and accessed so that the splice closures are capable of optimally carrying and providing access to numerous optical fibers and optical fiber splices.

BRIEF DESCRIPTION OF THE DRAWINGS

FIG. 6 is an isolated, partially schematic, front elevation view of a representative splicetray of the closure of FIG. 1.

FIG. 7 is an isolated, partially schematic, plan view of a tray-like base of the splice tray of FIG. 6.

FIG. 8 is an isolated, partially schematic, rear elevation view of the splice tray of FIG. 6.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Splice closures of the present invention advantageously contain multiple splice trays that can be individually pivoted and accessed so that the splice closures are capable of optimally carrying and providing access to numerous optical fibers and optical fiber splices.

First Embodiment

Figure 1:
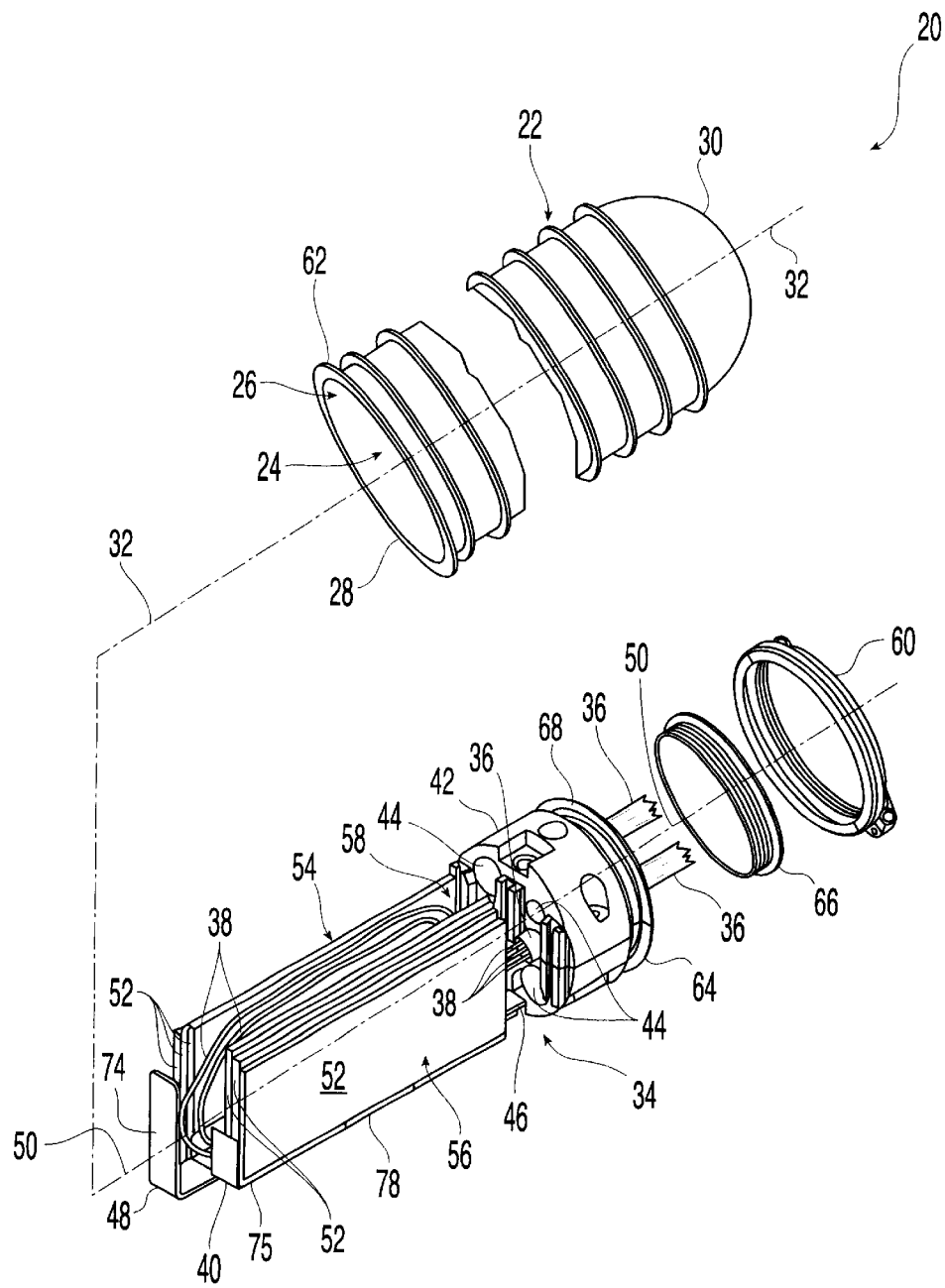
FIG. 1 is a partially schematic, generally rear, exploded pictorial view of a splice close, in accordance with a first embodiment of the present invention.

FIG. 1 illustrates an optical fiber interconnection closure in the form of a butttype splice closure 20. The closure 20 includes a housing 22 defining an internal cavity 24 and an opening 26 to the cavity. Whereas the housing 22 can have a variety of shapes, the illustrated housing has a generally cylindrical shape. The opening 26 is positioned at a front end 28 of the housing 22, and the opposite rear end 30 of the housing is closed. The wall of the housing 22 extends around and defines a housing axis 32 extending between the front end 28 and the rear end 30 of the housing. The cavity 24 receives and the housing 22 carries a butt-type support assembly 34. The support assembly 34 holds fiber optic cables 36. Buffer tubes 38 containing optical fibers (not shown) extend from the fiber optic cables 36. The support assembly 34 supports the buffer tubes 38, optical fibers, and splices (not shown) that connect the optical fibers. The buffer tubes 38 can contain individual optical fibers or optical fiber ribbons.

Figure 2:
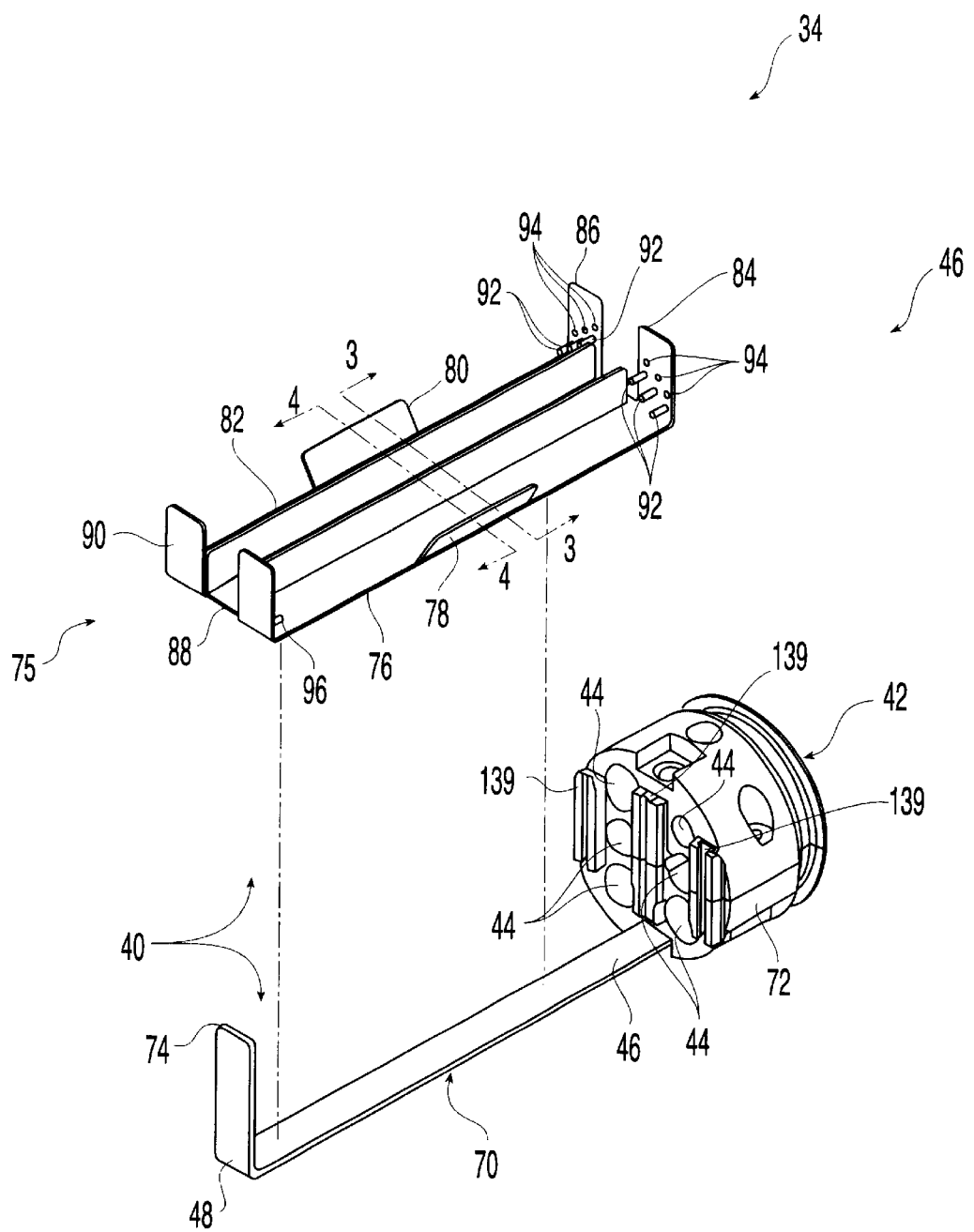
FIG. 2 is an isolated, generally rear, partially schematic, and partially exploded view of a support assembly of the closure of FIG. 1.

More specifically, the support assembly 34 includes an end cap 42 and a butt-type support frame 40 connected to and extending rearward from the end cap. Referring to FIG. 2, the end cap 42 defines multiple ports 44 that extend through the end cap, from the front to the rear of the end cap, for respectively receiving fiber optic cables 36 (FIG. 1). Ports 44 that are not occupied by fiber optic cables 36 are occluded by removable caps (not shown) positioned at the front side of the end cap 44. Whereas only two of the ports 44 are illustrated as being occupied by fiber optic cables 36 in FIG. 1, in accordance with another example of the first embodiment each of the ports 44 is in receipt of a respective fiber optic cable or a respective portion of a fiber optic cable. For each fiber optic cable 34, it is preferred for a respective hose clamp (not shown), or the like, to extend around the fiber optic cable and attach the fiber optic cable to a respective strain-relief bracket (not shown). The strain-relief brackets extend rearward from channels 139 (FIG. 2) defined by the rear side of the end cap 42.

Referring to FIG. 1, in accordance with the illustrated example of the first embodiment, the support frame 40 is carried by the end cap 42 in a cantilever-like fashion. The support assembly 34 is movable between an enclosed configuration and an unenclosed configuration. The end cap 42 is positioned in the opening 26 of the housing 22 during the enclosed configuration. The support frame 40 and the components carried thereby are positioned within the cavity 24 of the housing 22 during the enclosed configuration. In contrast, the end cap 42 is removed from the opening 26 to provide the unenclosed configuration. Likewise, the support frame 40 and the components carried thereby are removed from the cavity 24 during the unenclosed configuration.

The support frame 40 has a front end 46 and an opposite rear end 48. The support frame 40 extends in a longitudinal direction between the front and rear ends 46, 48, and the support frame defines a frame axis 50 extending in the longitudinal direction. In accordance with the first embodiment, the frame axis 50 is generally parallel to the housing axis 32 (FIG. 1) while the closure 20 (FIG. 1) is in the enclosed configuration. Whereas components of the present invention can be placed in many different orientations, components are at times described herein as being in a particular orientation, such as by referring to front and rear ends, for purposes of explanation, and not for purposes of limitation.

As will be discussed in greater detail below, the support assembly 34, or more specifically the support frame 40, removably and pivotally carries multiple splice trays 52. Each splice tray 52 is a container-like device designed for containing portions of at least some of the optical fibers and at least some of the splices that connect the optical fibers. The splice trays 52 are pivotable about respective splice tray pivot axes 53 (FIGS. 6–9) that are generally parallel to the frame axis 50. The splice trays 52 are in parallel configurations in FIG. 1. In contrast, some of the splice trays 52 are in nonparallel configurations in FIG. 9. Each splice tray 52 respectively defines and extends in a longitudinal plane that extends in the longitudinal direction while the splice tray is pivotally carried by the support frame 40 in the manner described below. All of the longitudinal planes of the splice trays 52 are parallel while the splices trays are in their parallel configurations. In contrast, not all of the longitudinal planes are parallel while one or more of the splice trays 52 are in their non-parallel configuration.

As shown in FIG. 1, a right group 54 of the splice trays 52 is spaced apart from a left group 56 of the slice trays 52 in a lateral direction that is generally perpendicular to the longitudinal direction. As a result, a storage space 58 is defined between the right and left groups of splice trays 52. Excess portions of buffer tubes 38 are coiled and placed in the storage space 60.

Although the end cap 42 can be secured to the housing 22 in a variety of different manners known to those of ordinary skill in the art, the illustrated closure 20 includes a split annular collar 60 that securely engages a circumferential flange 62 of the housing 22 and a circumferential flange 64 of the end cap 42 to secure the end cap to the housing. The collar 60 and circumferential flanges 62, 64 cooperate with an O-ring 66 that is received in a circumferential channel 68 defined by the end cap 42. As a result, and assuming all other openings are sealed, the cavity 24 of the housing 22 is substantially watertight while the closure 20 is in the enclosed configuration. Although the closure 20 illustrated in FIG. 1 is a butt-type closure, the closures of the present invention can be in-line closures or other types of closures without departing from the scope of the present invention.

Referring to FIG. 2, the support frame 40 includes a support bar 70 having a front end connected proximate to a generally cylindrical peripheral or circumferential surface 72 of the end cap 42 by a threaded attachment device such as a bolt 73 (FIG. 9), or the like. The rear end of the support bar 70 is in the form of an appendage 74 that extends perpendicularly with respect to the frame axis 50 (FIG. 1). The appendage 74 is generally a rear boundary to the storage space 58 (FIG. 1). That is, the appendage 74 functions to help retain the excess portions of the buffer tubes 38 (FIG. 1) in the storage space 58.

The support frame 40 further includes a carrier assembly 75 that is exploded away from the support bar 70 in FIG. 2. The carrier assembly 75 includes a base-like plate member 76 that is mounted to the support bar 70 by threaded attachment devices, welding, or the like. A left restricting flange 78 extends from a left longitudinal edge of the plate member 76. Similarly, a right restricting flange 80 extends from a right longitudinal edge of the plate member 76. Each of the restricting flanges 78, 80 extend at an acute angle with respect to the broad upper surface of the plate member 76. The restricting flanges 78, 80 function as stops for restricting the pivoting of the respective splice tray 52 (FIG. 1) most proximate thereto, as will be discussed in greater detail below.

A U-shaped channel 82 extends between a front lateral edge of the plate member 76 and an opposite rear lateral edge of the plate member. The walls of the U-shaped channel 82 at least partially define a lower portion of the storage space 58 (FIG. 1). In addition, the longitudinally extending upper edges the walls of the U-shaped channel 82 that extend generally perpendicularly from the broad surface of the plate member 76 function as stops for restricting the pivoting of the respective splice tray 52 (FIG. 1) most proximate thereto, as will be discussed in greater detail below. In addition, the walls of the U-shaped channel 82 that extend generally perpendicularly from the broad surface of the plate member 76 function to restrict any buffer tubes 38 contained in the storage space 58 from becoming entangled in the space defined between the upper surface of the plate member 76 and the bottoms of the splice trays 52 (FIG. 1), which will be discussed in greater detail below.

Figure 3:
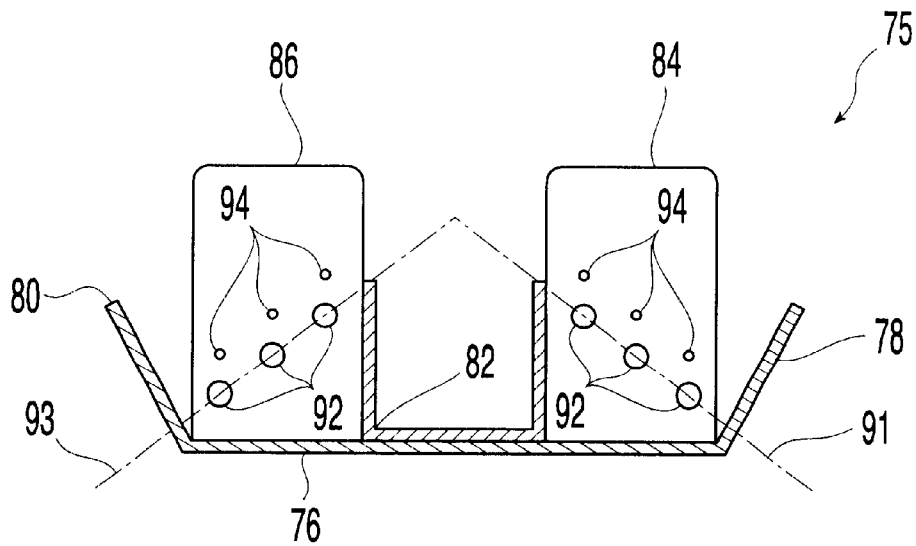
FIG. 3 is an isolated, partially schematic cross-sectional view of a carrier assembly of the support assembly of FIG. 2, taken along line 3—3 of FIG. 2.

Referring to FIGS. 2 and 3, a series of passive pivots 92 are mounted to and carried by left and right front extensions 84, 86. The front extensions 84, 86 respectively extend from left and right portions of the front lateral edge of the plate member 76. The front extensions 84, 86 extend generally perpendicularly from the broad surface of the plate member 76 upon which the U-shaped channel 82 is mounted. The passive pivots 92 are preferably rods, pins, or the like.

As illustrated in FIG. 3, the passive pivots 92 carried by the left front extension 84 are arranged along a line 91, and the passive pivots carried by the right front extension 86 are arranged along a line 93 that defines an obtuse angle with respect to the line 91. Each of the lines 91, 93 individually form an acute angle with respect to the surface of the plate member 76 that carries the U-shaped channel 82. A respective restrictive receptacle 94 is positioned above each of the passive pivots 92 carried by the front extensions 84, 86. The restrictive receptacles 94 are preferably recesses or apertures defined by the front extensions 84, 86.

Figure 4:
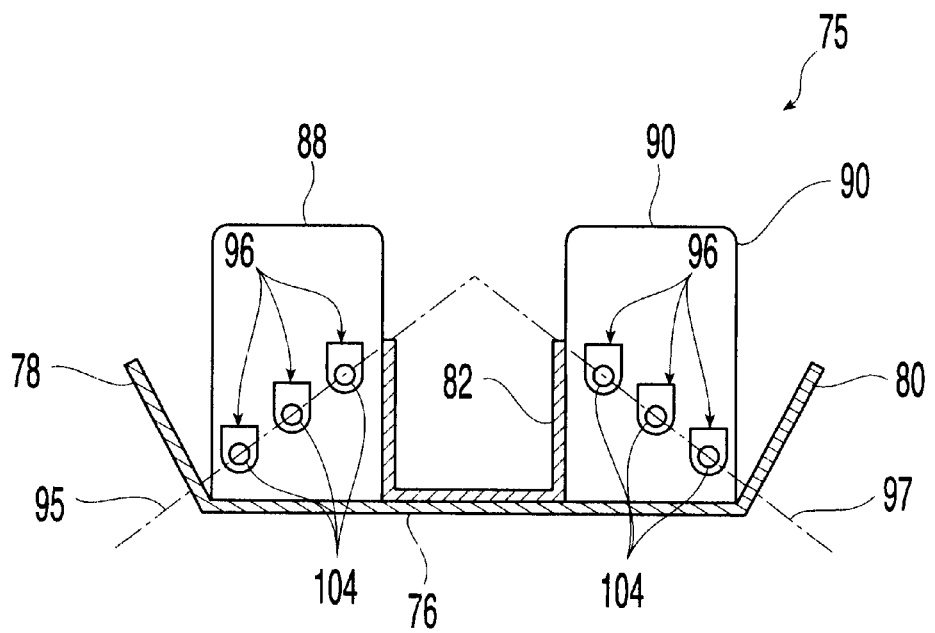
FIG. 4 is an isolated, partially schematic cross-sectional view of the carrier assembly taken an line 4—4 of FIG. 2.

Referring to FIG. 4, a series of active pivots 96 are respectively mounted to and carried by left and right rear extensions 88, 90. The rear extensions 88, 90 respectively extend from left and right portions of the rear lateral edge of the plate member 76. The rear extension 88, 90 extend generally perpendicularly from the broad surface of the plate member 76 upon which the U-shaped channel 82 is mounted. The active pivots 96 carried by the left rear extension 88 are arranged along a line 95, and the active pivots carried by the right rear extension 90 are arranged along a line 97 that defines an obtuse angle with respect to the line 95. Each of the lines 95, 97 individually form an acute angle with respect to the surface of the plate member 76 that carries the U-shaped channel 82.

A representative one of the active pivots 96 will now be described with reference to FIG. 5. Although the described representative active pivot 96 is one of the group of active pivots mounted to and carried by the left rear extension 88, a corresponding group of the active pivots is similarly mounted to and carried by the right rear extension 90 (FIG. 4). As one acceptable example, the representative active pivot 96 includes a telescoping assembly 98, or the like, having one end mounted to and carried by the left rear extension 88 and an opposite end that carries a lobe 100. The telescoping assembly 98 includes an inner rod or pin that extends into an axial cavity of an outer rod or pin, or the like, as illustrated by broken lines in FIG. 5. The lobe 100 includes a broad camlike guiding surface 102 that tapers to a generally pointed terminus 104. A biasing mechanism of the representative active pivot 96 is illustrated in the form a spring 105. A middle portion of the spring 105 is cut away in FIG. 5 in order to more clearly show the telescoping assembly 98. The spring 105 has opposite ends that are respectively immovably mounted with respect to the left rear extension 88 and the lobe 100. The spring 105 biases the lobe 100 away from the left rear extension 88 and also functions to hold the lobe so that the lobe does not become separated from its telescoping assembly 98.

A representative one of the splice trays 52 (FIG. 1) will now be described with reference to FIGS. 6–8. The splice tray 52 includes a tray-like base 106, a splice organizer 108 mounted to the tray-like base and defining a plurality of parallel grooves for respectively receiving optical fiber splices, and a removable cover 110 for generally closing the tray-like base to cover and protect the splices carried by the splice organizer. Closing and reopening of the splice tray 52 is facilitated by longitudinally extending and curved lips 112 of the cover 110 that snap over longitudinally extending and curved lips 114 of the tray-like base 106.

Referring to FIG. 7, the tray-like base 106 includes tabs 116 at its opposite front and rear ends. The tabs 116 are designed for being crimped around buffer tubes 38 (FIG. 1) that enter the splice tray 54. The tray-like base 106 defines multiple apertures 118, each of which is designed for receiving a conventional cable tie (not shown), or the like, that holds buffer tubes 38 entering the splice tray 54. Referring primarily to FIG. 6, the tray-like base 106 includes a front wall 120 that partially occludes a front opening 122 to the interior of the splice tray 52. The front wall 120 defines a front pivot receptacle 124 and a restrictive protrusion 126. The restrictive protrusion 126 is preferably a bump, or the like, that extends forward from the front surface of the front wall 120. Referring to FIG. 8, the tray-like base 106 further includes a lower rear wall 128 and an upper rear wall 130 that together partially occlude a rear opening 132 to the interior of the splice tray 52. The lower rear wall 128 defines a rear pivot receptacle 136. Each of the pivot receptacles 124, 136 (FIGS. 6 and 8) is preferably an aperture, or the like.

As will be discussed in greater below, the front pivot receptacle 124 (FIG. 6) of the splice tray 52 receives a respective one of the passive pivots 92 (FIGS. 2 and 3), and the rear pivot receptacle 136 (FIG. 8) receives a respective one of the active pivots 96 (FIGS. 4 and 5) so that the splice tray is pivotally carried by respective pivots that are carried by the carrier assembly 75 (FIGS. 2–4). As illustrated by broken lines in FIG. 7, in accordance with an alternative embodiment of the present invention, the tray-like base 106 further includes supplemental walls 138 that respectively cooperate with the front wall 120 and the lower rear wall 128, and other walls of the splice tray 52, to define protective chambers. The protective chambers respectively receive the tips of the pivots 92, 96 that protrude into the pivot receptacles 124, 136 (FIGS. 6 and 8). The protective chambers isolate and protect the buffer tubes 38 (FIG. 1) contained by the splice tray 52 from the tips of the pivots 92, 96 that pivotally carry the splice tray.

Referring to FIGS. 1, 3, and 4, the right-most splice tray 52 of the right group 54 of splice trays is pivotally carried by both the right-most passive pivot 92 carried by the right front extension 86 and the right-most active pivot 96 carried by the right rear extension 90. Likewise, the middle splice tray of the right group 54 is pivotally carried by both the middle passive pivot 92 carried by the right front extension 86 and the middle active pivot 96 carried by the right rear extension 90. Similarly, the left-most splice tray 52 of the right group 54 is pivotally carried by both the left-most passive pivot 92 carried by the right front extension 86 and the left-most active pivot 96 carried by the right rear extension 90.

The right-most splice tray 52 of the left group 56 of splice trays is pivotally carried by both the right-most passive pivot 92 carried by the left front extension 84 and the right-most active pivot 96 carried by the left rear extension 88. Likewise, the middle splice tray of the left group 56 is pivotally carried by both the middle passive pivot 92 carried by the left front extension 84 and the middle active pivot 96 carried by the left rear extension 88. Similarly, the left-most splice tray 52 of the left group 56 is pivotally carried by both the left-most passive pivot 92 carried by the left front extension 84 and the left-most active pivot 96 carried by the left rear extension 88.

Figure 5:
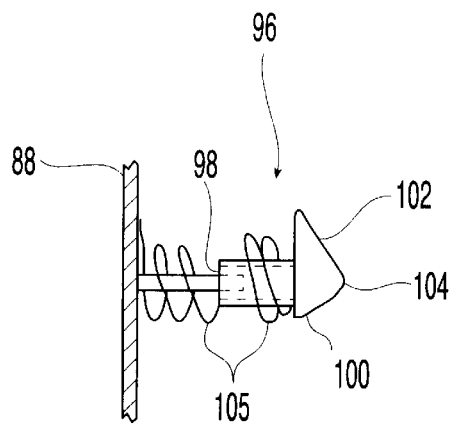
FIG. 5 schematically illustrates a representative active pivot of the carrier assembly of FIG. 2.

The manual installation of a representative one of the splice trays 52 that is initially separate from and distant from the carrier assembly 75 (FIGS. 2–4) will now be described with respect to a respective passive pivot 92 (FIGS. 2–3) and a respective active pivot 96 (FIGS. 4–5). The front end of the splice tray 52 is moved toward the passive pivot 92 so that the terminus of the passive pivot is received in the front pivot receptacle 124 (FIG. 6). Thereafter, the rear end of the splice tray 52 is lowered so that the lower rear wall 128 (FIGS. 7–8) of the splice tray slidingly engages the guiding surface 102 (FIG. 5) of the active pivot 96. Thereafter, the rear end of the splice tray 52 continues to be lowered so that the lower rear wall 128 continues to slidingly engage the guiding surface 102 and the spring 105 (FIG. 5) of the active pivot 96 is compressed. The rear end of the splice tray 52 is lowered so the terminus 104 (FIGS. 4–5) of the lobe 100 becomes aligned with and received in the rear pivot receptacle 136 (FIG. 8). Thereafter, the splice tray 52 is released and the spring 105 of the active pivot 96 expands so that the lobe 100 forces the splice tray 52 forward. As a result, the passive pivot 92 remains within the front pivot receptacle 124 and the terminus 104 of the active pivot 96 remains in the rear pivot receptacle 136. The pivot axis 53 of the splice tray 52 is coaxial with the pivots 92, 96 carrying the splice tray.

The manual removal of a representative one of the splice trays 52 from the respective pivots 92, 96 pivotally carrying the splice tray 52 will now be described. The splice tray 52 is manually moved rearward to compress the spring 105 of the active pivot 96 until the passive pivot 92 no longer extends into the front pivot receptacle 124. Thereafter, the front end of the splice tray 52 is tilted upward and the entire splice tray 52 is moved forward and upward so the terminus 104 of the active pivot 96 is withdrawn from the rear pivot receptacle 136.

Figure 9:
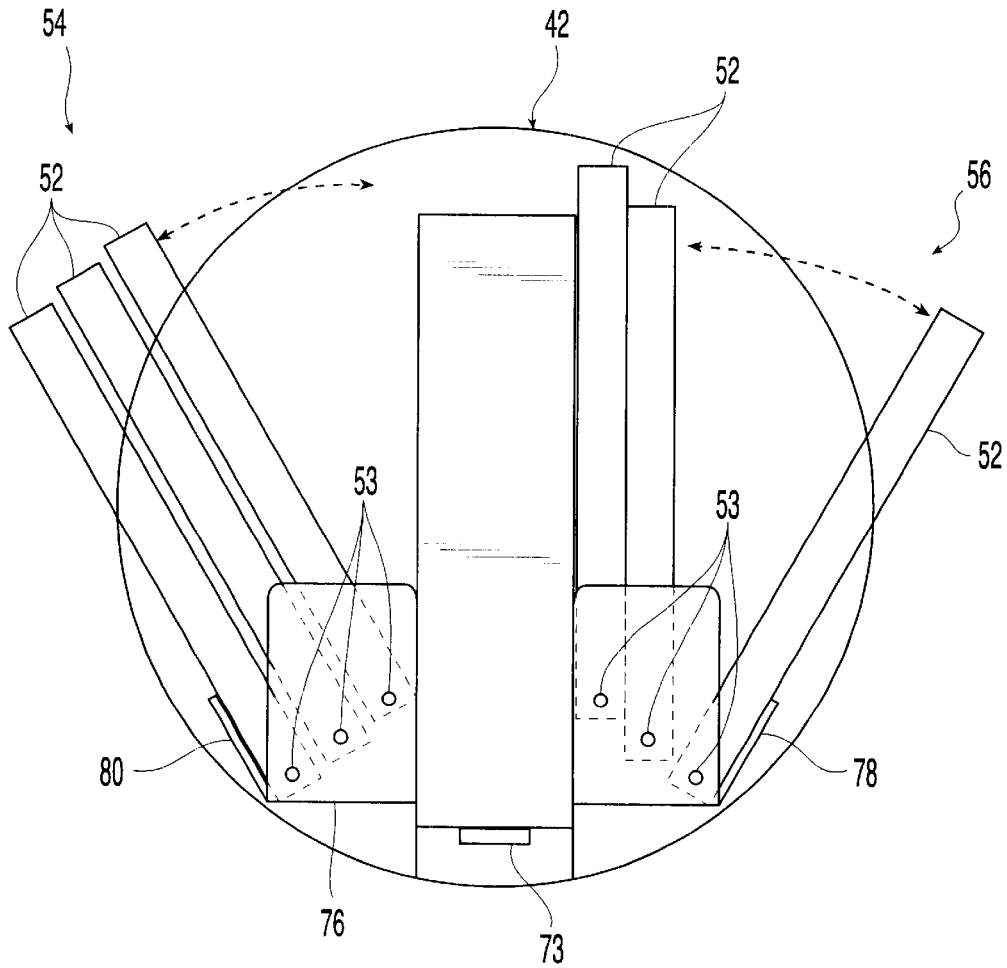
FIG. 9 is a schematic, rear elevation view of the support assembly and splice trays of FIG. 1, with some of the splice trays in parallel configurations and other of the splice trays in non-parallel configurations, in accordance with the first embodiment of the present invention.

As mentioned above, splice trays 52 pivotally carried between respective pivots 92, 96 can be pivoted about their respective pivot axes 53 (FIGS. 6–9) between parallel configurations (illustrated in FIG. 1) and non-parallel configurations (some of which are illustrated in FIG. 9), while the closure 20 (FIG. 1) is in the unenclosed configuration. A splice tray 52 that is in its parallel configuration extends generally perpendicularly from the surface of the plate member 76 that carries the U-shaped channel 82. The parallel configurations provide for compact packaging of the pivoting splice trays 52. The non-parallel configurations provide optimal access to the splice trays 52 so that one or more of the splice trays can be readily individually removed from or installed to the carrier assembly 75 in the manners described above.

Due to the arrangements of the pivots 92, 96 along their respective lines 91, 95, 93, 97 (FIGS. 3 and 4), the bottom sides of the splice trays 52 define a cascade-like configuration while in their parallel configurations. The cascade-like configuration is partially illustrated in broken lines in FIG. 9 with respect to the two splice trays 52 of the left group 56 that are in their parallel configurations. The cascade-like configuration of the bottom sides of adjacent splice trays 52 allows a lower corner of a lower one of the adjacent pair of splice trays to be pivoted to a position that is directly beneath the lower end of the upper one of the adjacent pair of splice trays. This feature is illustrated in broken lines in FIG. 9 with respect to the left-most pair of splice trays 52 of the left group 56. This feature provides for the pivoting of the compactly packaged splice trays 52.

Pivoting of the splice trays 52 installed to the carrier assembly 75 is restricted by several different features. For example, and as mentioned above, the restricting flanges 78, 80 (FIGS. 2–4) function as stops for restricting the pivoting of the splice tray 52 most proximate thereto. As also mentioned, the longitudinally extending upper edges of the walls of the U-shaped channel 82 (FIGS. 2–4) that extend generally perpendicularly from the broad surface of the plate member 76 function as stops for restricting the pivoting of the splice trays 52 most proximate thereto. In addition, the interaction of a representative one of the splice trays 52 and the respective restrictive receptacle 94 (FIGS. 2–3) associated therewith will now be described. The restrictive protrusion 126 (FIGS. 6–7) cooperates with the restrictive receptacle 94 to releasably hold the splice tray 52 in its parallel configuration (for example, each of the splice trays is in its parallel configuration in FIG. 1). The restricting interaction between the protrusion 126 and the receptacle 94 can be manually overcome so that the splice tray 52 can be pivoted to its non-parallel configuration (for example, a majority of the splice trays are in their nonparallel configuration in FIG. 9). In accordance with an alternative embodiment of the present invention, multiple additional restrictive receptacles 94 are defined in the rear surfaces of the front extensions 84, 86 (FIGS. 2–3) for respectively removably receiving the restrictive protrusions 126 while the splice trays 52 are arranged in configurations other than the parallel configurations.

In addition, a removable elongate fastener (not shown), such as a strap, is wrapped around the splice trays 52 and the carrier assembly 75 while all of the splice trays 52 are intended to remain in their parallel configurations, such as during the enclosed configuration. The ends of the strap preferably include pieces of attachment material, such as that sold under the trademark VELCRO, clasps, or other connecting mechanisms for allowing the strap to securely hold the splice trays 52 and excess portions of buffer tubes 38 (FIG. 1) to the carrier assembly 75. The strap can also hold additional components (not shown) to the carrier assembly 75, such as conventional container-like devices for containing optical fibers, including slack baskets and splice trays, or the like.

Referring to FIGS. 2–3 and 6–7, in accordance with an alternative embodiment of the present invention, each of the restrictive receptacles 94 of the front extensions 84, 86 is replaced with a restrictive protrusion (for example see the restrictive protrusion 126), and each of the restrictive protrusions 126 of the splice trays 52 is replaced with a restrictive receptacle (for example see the restrictive receptacles 94). In accordance with another alternative embodiment of the present invention, each of the front extensions 84, 86 is absent of the restrictive receptacles 94 and the splice trays 52 are absent of the restrictive protrusions 126.

Second Embodiment

A closure of a second embodiment of the present invention is identical to the closure 20 (FIG. 1) of the first embodiment of the present invention, except for variations noted and variations apparent to those of ordinary skill in the art in view of this disclosure-In accordance with the second embodiment, the splice trays carried by the carrier assembly 75 (FIGS. 2–4) are different from the splice trays 52 (FIGS. 1, 6, 8 and 9) of the first embodiment. More specifically, each of the splice trays of the second embodiment includes a tray-like base 106a (partially shown in FIG. 10) rather than the tray-like base 106 (FIGS. 6–8) of the first embodiment.

Figure 10:
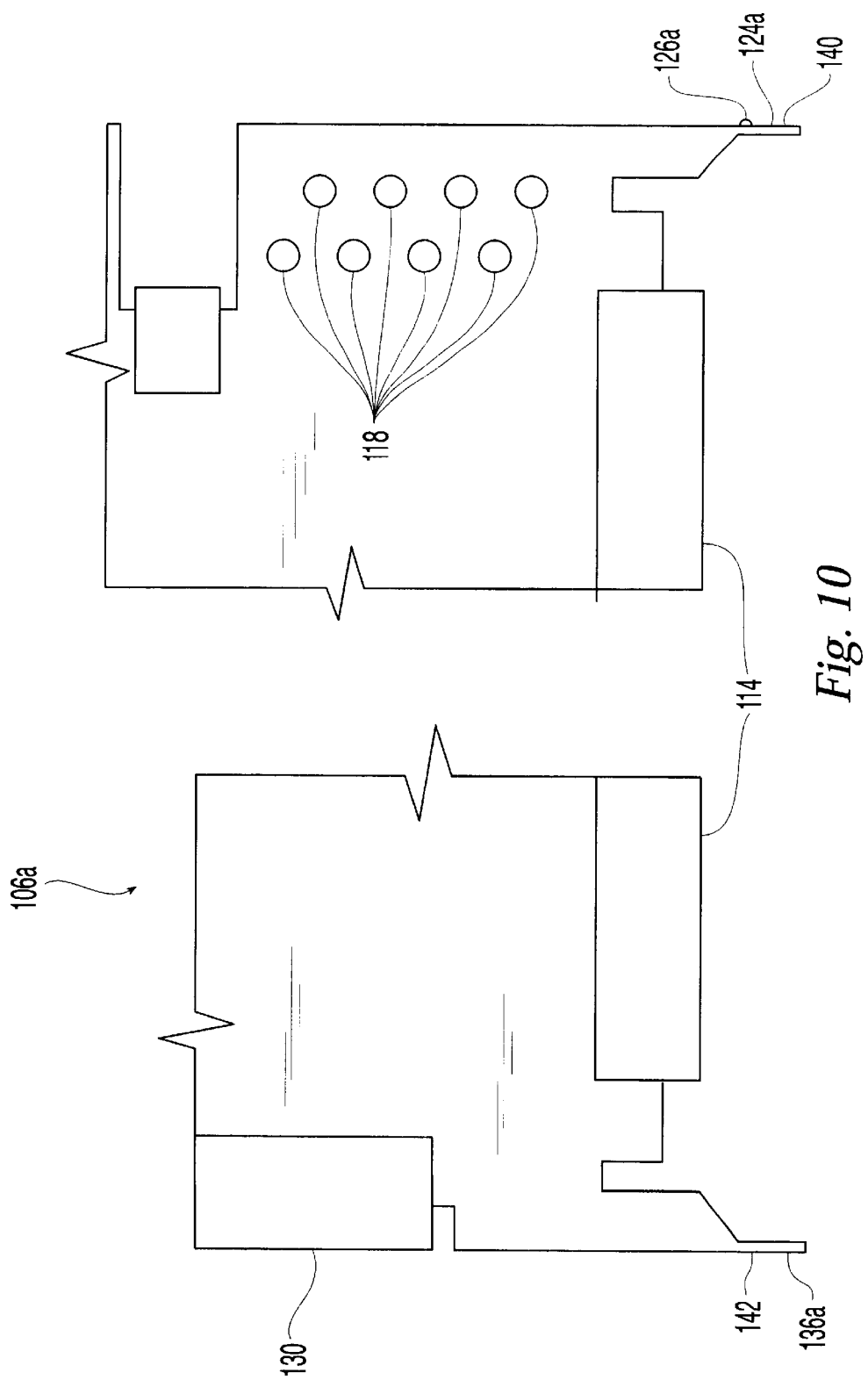
FIG. 10 is a partially schematic plan view of lower front and rear portions of a tray-like base of a splice tray, in accordance with a second embodiment of the present invention.
Figure 11:
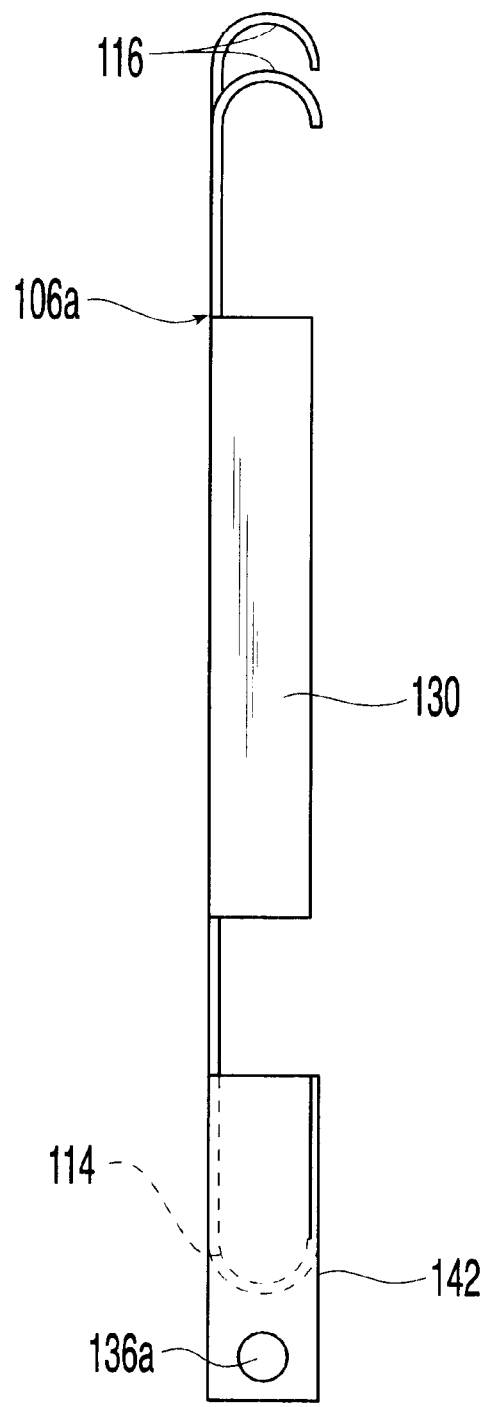
FIG. 11 is an isolated, partially schematic, rear elevation view of the splice tray of FIG. 10.

A representative tray-like base 106a of the second embodiment will now be described with reference to FIGS. 10 and 11. Rather than including the front and lower rear walls 120, 128 (FIGS. 6–8), the tray-like base 106a includes front and rear tabs 140, 142 that extend beyond the lower lip 114 of the tray-like base. Tabs 140, 142 defining the pivot receptacles 124a, 136a extend perpendicularly to the portion of the tray-like base 106a defining the apertures 118, as illustrated in FIG. 10. The tabs 140, 142 are preferably reinforced, if necessary, to increase their rigidity.

In use, the front pivot receptacle 124a receives and is pivotally carried by a respective passive pivot 92 (FIGS. 2 and 3), the rear pivot receptacle 136a receives and is pivotally carried by a respective active pivot 96 (FIGS. 4 and 5), and the restrictive protrusion 126a cooperates with a respective restrictive receptacle 94 (FIGS. 2 and 3).

Third Embodiment

A closure of a third embodiment of the present invention is identical to the closure 20 (FIG. 1) of the first embodiment of the present invention, except for variations noted and variations apparent to those of ordinary skill in the art in view of this disclosure. In accordance with the third embodiment, a carrier assembly 75b (FIG. 12) is used in place of the carrier assembly 75 (FIGS. 2–4) of the first embodiment.

Figure 12:
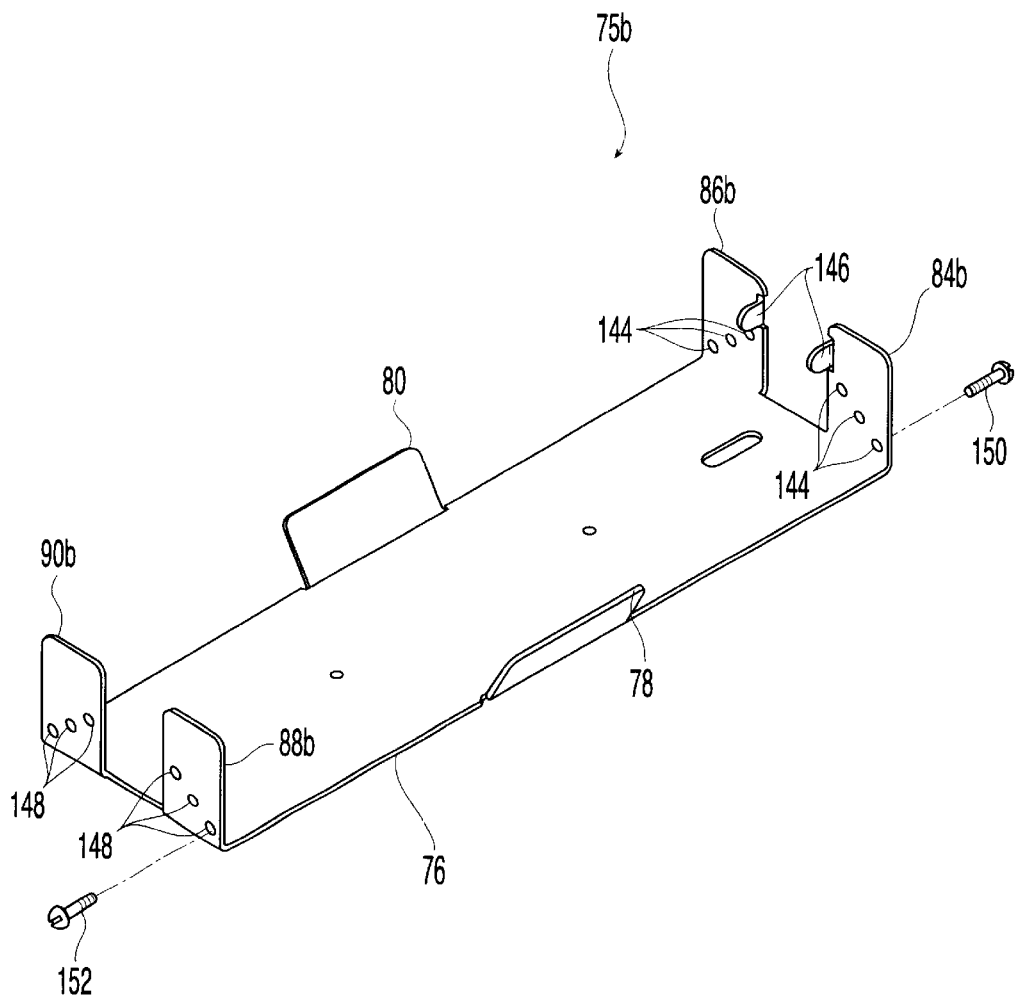
FIG. 12 is an isolated pictorial view of a carrier assembly with a pair of schematically illustrated pivots exploded therefrom, in accordance with a third embodiment of the present invention.

Referring to FIG. 12, the carrier assembly 75b of the third embodiment is different from the carrier assembly 75 (FIGS. 2–4) of the first embodiment because the carrier assembly 75b of the third embodiment does not include the restrictive receptacles 94 (FIGS. 2–3), each of the passive pivots 92 (FIGS. 2–3) is replaced with a front pivot receptacle 144, and each of the active pivots 96 (FIGS. 4–5) is replaced with a rear pivot receptacle 148. Each of the pivot receptacles 144, 148 is preferably an aperture, or the like, respectively defined through one of the extensions 84b, 86b, 88b, 90b. In addition, rather than including, or alternatively in addition to including, the U-shaped channel 82 (FIGS. 2–4), the carrier assembly 75b includes a pair of restricting tabs 146 extending rearward from the front extensions 84b, 86b. The restricting tabs 146 function as stops for restricting the pivoting of the splice trays 52 (FIGS. 1, 6, 8, and 9) most proximate thereto so that those splice trays do not pivot into the storage space 58 (FIG. 1) defined between the right and left groups 54, 56 (FIG. 1) of splice trays.

The installation of a representative splice tray 52 (FIGS. 1, 6, 8, and 9) to the carrier assembly 75b of the third embodiment will now be described with respect to representative pivot receptacles 144, a representative pivot receptacle 148 and representative pivots 150, 152. The pivot receptacles 124, 136 (FIGS. 6 and 8) of the splice tray 52 are respectively aligned with the pivot receptacles 144, 148. A front pivot 150 that is initially separate from the splice tray 52 and the carrier assembly 75b is positioned through the aligned pivot receptacles 124, 144 so that the front pivot is carried by the carrier assembly and pivotally carries the splice tray. Likewise, a rear pivot 152 that is initially separate from the splice tray 52 and the carrier assembly 75b is positioned through the aligned pivot receptacles 136, 148 so that the rear pivot is carried by the carrier assembly and pivotally carries the splice tray. The front and rear pivots 150, 152 are removed from the pivot receptacles 124, 136, 144, 148 to release the splice tray 52 from the carrier assembly 75b. The front and rear pivots 150, 152 are preferably each conventional threaded devices, such as screws or bolts, or the like.

Fourth Embodiment

A closure of a fourth embodiment of the present invention is identical to the closure 20 (FIG. 1) of the third embodiment of the present invention, except for variations noted and variations apparent to those of ordinary skill in the art in view of this disclosure. In accordance with the illustrated example of the fourth embodiment, the splice trays carried by the carrier assembly 75b (FIG. 12) are identical to the splice trays of the second embodiment, except for variations noted and variations apparent to those of ordinary skill in the art in view of this disclosure. More specifically, the splice trays of the fourth embodiment are different from the splice trays of the second embodiment in that each includes a tray-like base 106c (partially shown in FIG. 13) rather than the tray-like base 106a (FIG. 10) of the second embodiment.

A representative tray-like base 106c of the fourth embodiment will now be described with reference to FIG. 13.

The tray-like base 106c of the fourth embodiment is different from the tray-like base 106a (FIG. 10) of the second embodiment because the front pivot receptacle 124a (FIG. 10) is replaced with a passive pivot 92c. The passive pivot 92c is mounted to and carried by the front tab 140c. In isolation the passive pivot 92c is generally like the passive pivots 92 (FIGS. 2–3) of the first embodiment. The tray-like base 106c of the fourth embodiment is also different from the tray-like base 106a of the second embodiment because the rear pivot receptacle 136a (FIG. 10) is replaced with an active pivot 96c. The active pivot 96c is mounted to and carried by the rear tab 142c. In isolation the active pivot 96c is generally like the active pivots 96 (FIGS. 4–5) of the first embodiment. The active pivot 96c is oriented so that the guiding surface 102 thereof is positioned below the terminus 104 thereof.

Figure 13:
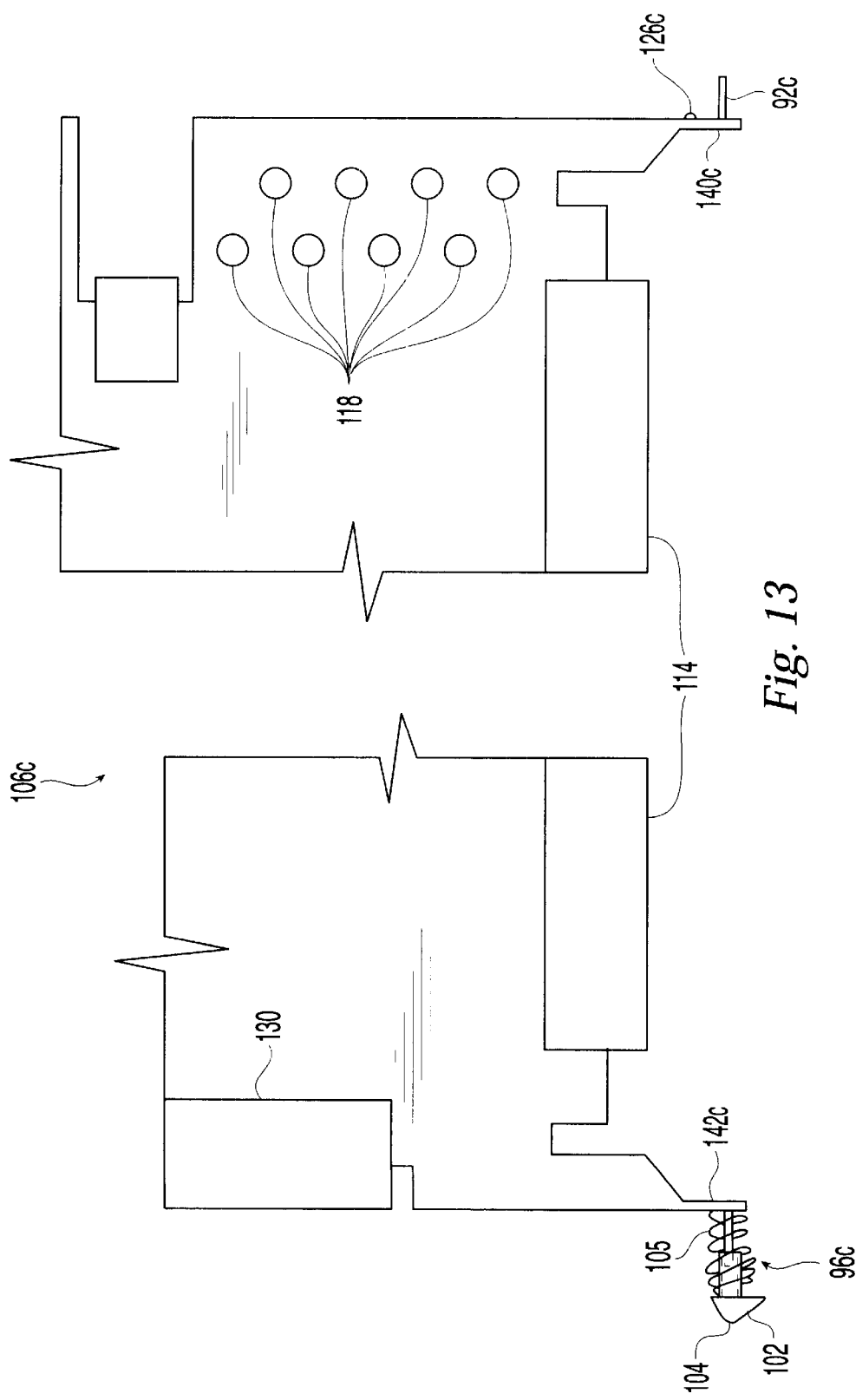
FIG. 13 is a partially schematic plan view of lower front and rear portions of a tray-like base of a splice tray, in accordance with a fourth embodiment of the present invention.

Referring to FIGS. 12 and 13, the manual installation of a representative one of the splice trays of the fourth embodiment that is initially separated from and distant from the carrier assembly 75b (FIG. 12) will now be described with respect to a representative front pivot receptacle 144 and a representative rear pivot receptacle 148. The passive pivot 92c of the splice tray of the fourth embodiment is moved toward the front pivot receptacle 144 so that the terminus of the passive pivot 92c is received in the front pivot receptacle 144. The active pivot 96c of the splice tray of the fourth embodiment is lowered toward the rear pivot receptacle 148 so that the guiding surface 102 of the active pivot 96c slidingly engages the respective rear extension 88b, 90b and the spring 105 of the active pivot 96c is compressed, while the passive pivot 92c remains in the front pivot receptacle. The rear end of the splice tray of the fourth embodiment is further lowered so the terminus 104 of the lobe 100 of the active pivot 96c becomes aligned with and received in the rear pivot receptacle 148. Thereafter, the splice tray of the fourth embodiment is released and the spring 105 of the active pivot 96c expands so that the lobe 100 forces the splice tray of the fourth embodiment forward. As a result, the passive pivot 92c remains within the front pivot receptacle 144 and the terminus 104 of the active pivot 96c remains in the rear pivot receptacle 148. The pivot axis (for example see the pivot axes 53 in FIGS. 6–7) of the splice tray of the fourth embodiment is coaxial with the pivots 92c, 96c carrying the splice tray and carried by the carrier assembly 75b.

The manual removal of a representative one of the splice trays of the fourth embodiment from representative front and rear pivot receptacles 144, 148 pivotally carrying the splice tray will now be described. The splice tray of the fourth embodiment is manually moved rearward to compress the spring 105 of the active pivot 96c until the passive pivot 92c no longer extends into the front pivot receptacle 144. Thereafter, the front end of the splice tray of the fourth embodiment is tilted upward and the entire splice tray 52 is moved forward and upward so that the terminus 104 of the active pivot 96c is withdrawn from the rear pivot receptacle 148.

It is within the scope of the fourth embodiment for the front extensions 84b, 86b (FIG. 12) to each include a series of restrictive receptacles (for example see the restrictive receptacles 94 illustrated in FIGS. 2–3) arranged for cooperating with restrictive protrusions 126c (FIG. 13) of the splice trays of the fourth embodiment in the same general manner that the protrusions 126 (FIGS. 6–7) and restrictive receptacles 94 (FIGS. 2–3) of the first embodiment cooperate. It is also within the scope of the fourth embodiment for each of the splice trays 52 (FIGS. 1, 6, 8 and 9) of the first embodiment to be modified by replacing the front pivot receptacle 124 (FIG. 6) with an active pivot 96c (FIG. 13) and by replacing the rear pivot receptacle 136 (FIG. 8) with a passive pivot 92c (FIG. 13), and for each of those modified splice trays to be pivotally carried by the carrier assembly 75b as described above with respect to the tray-like base 106c.

Fifth Embodiment

Figure 14:
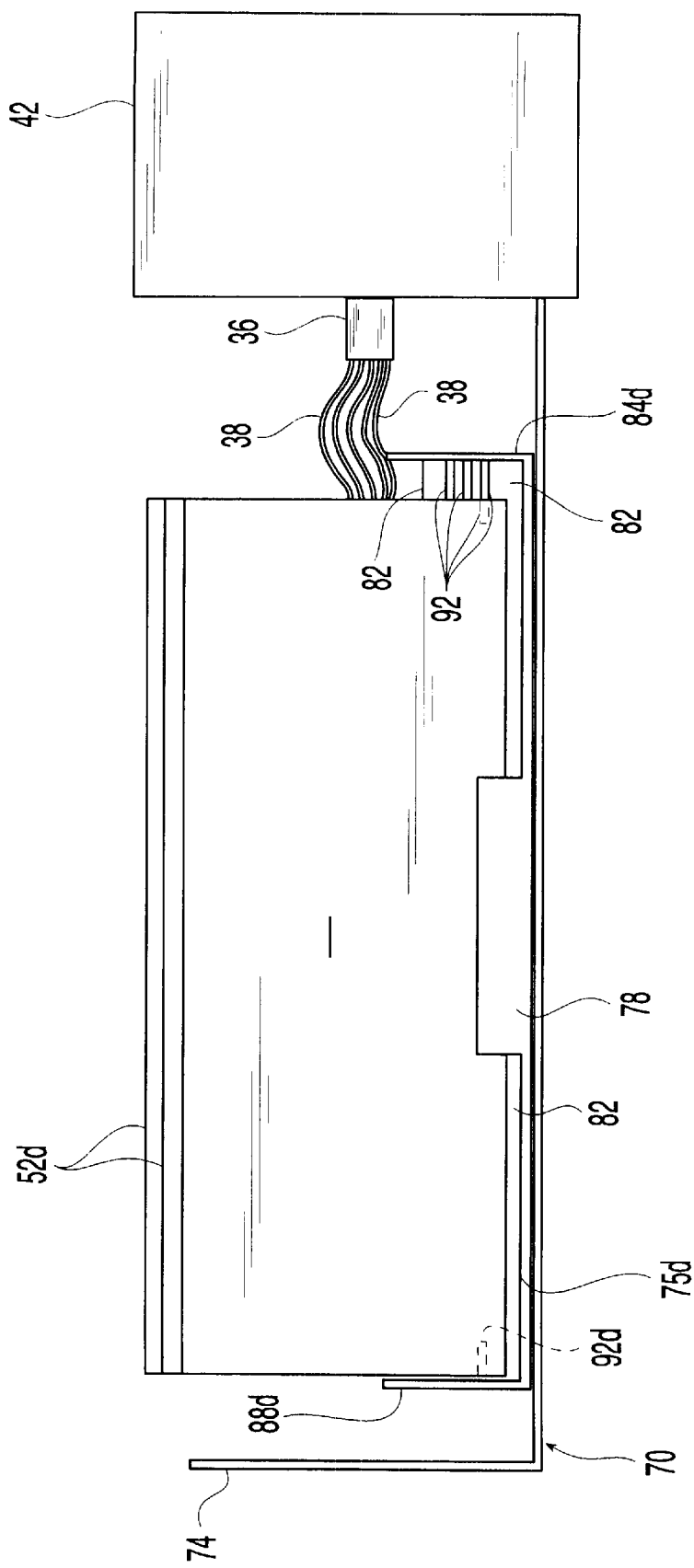
FIG. 14 is a schematic, left side elevation view of a support assembly and splice trays in parallel configurations, in accordance with a fifth embodiment of the present invention.

A closure of a fifth embodiment of the present invention is identical to the closure 20 (FIG. 1) of the first embodiment of the present invention, except for variations noted and variations apparent to those of ordinary skill in the art in view of this disclosure. In accordance with the fifth embodiment, a carrier assembly 75d (FIG. 14) is used in place of the carrier assembly 75 (FIGS. 2–4) of the first embodiment. Referring to FIG. 14, the carrier assembly 75d of the fifth embodiment is different from the carrier assembly 75 of the first embodiment because the active pivots 96 (FIGS. 4–5) are each respectively replaced with passive pivots 92d (only one of which is illustrated by broken lines in FIG. 14) that are similar to the passive pivots 92 (FIGS. 2–3). The carrier assembly 75d of the fifth embodiment is also different from the carrier assembly 75 of the first embodiment because the restrictive receptacles (not shown in FIG. 14, but see the restrictive receptacles of 94 illustrated in FIGS. 2–3) are defined by the left rear extension 88d and the right rear extension (hidden from view in FIG. 14, but see the right rear extension 90 illustrated in FIGS. 2 and 4 for example) rather than the left front extensions 84d and the right front extension (hidden from view in FIG. 14, but see the left front extension 86 illustrated in FIGS. 2–3 for example).

In accordance with the fifth embodiment, splice trays 52d (FIG. 14) are used in place of the splice trays 52 (FIGS. 1, 6, and 8) of the first embodiment. The splice trays 52d of the fifth embodiment are different from the splice trays 52 of the first embodiment because the restrictive protrusions 126 (FIGS. 6–7) of the splice trays 52d are defined by the lower rear walls 128 (FIGS. 7–8) rather than the front walls 120 (FIGS. 6–7).

The fifth embodiment will now be described with reference to a representative leftmost splice tray 52d illustrated in FIG. 14 and representative front and rear left-most passive pivots 92, 92d illustrated in FIG. 14. The terminus of the representative left-most front passive pivot 92 and the entirety of the left-most rear passive pivot 92d are illustrated by broken lines in FIG. 3 because those portions respectively extend into the pivot receptacles 124, 136 (FIGS. 6 and 8) of the left-most splice tray 52d and are therefore hidden from view. There is an excess length of one or more components of one of the fiber optic cables 36, and that excess length biasingly forces the splice tray 52d rearward. More specifically, an excess length of the sections of the buffer tubes 38 that extend generally from proximate the end cap 42 into the front end of the splice tray 52d is provided so that those sections of the buffer tubes biasingly force the splice tray 52d rearward. The excess length is selected so that the subject sections of the buffer tubes 38 tend to define a curved shape, or the like, while the splice tray 52d is carried by the carrier assembly 75d. The biasing results because the buffer tubes 38 are biased toward generally straight configurations. The excess length is not so great that the buffer tubes are bent in a manner that is damaging to the optical fibers therein. The lengths of the passive pivots 92, 92d are selected so that at least the terminuses of the passive pivots 92, 92c respectively remain within the pivot receptacles 124, 136 of the splice tray 52d while the splice tray is pivotally carried by the passive pivots 92, 92d and biasingly forced rearward by the buffer tubes 38.

The installation of the representative left-most splice tray 52d illustrated in FIG. 14 will now be described with reference to the representative front and rear left-most passive pivots 92, 92d illustrated in FIG. 14. The splice tray 52d is manually moved relative to the carrier assembly 75d so that the buffer tubes 38 positioned in front of and extending into the splice tray are bent, and the front pivot 92 is received into the front pivot receptacle 124 (FIG. 6). Thereafter, the splice tray 52d is moved so that the rear passive pivot 92d is received into the rear pivot receptacle 136 (FIG. 8). Thereafter, the splice tray 52d is released and the buffer tubes 38 that extend from proximate the end cap 42 into the front end of the splice tray 52d biasingly force the splice tray 52d rearward to retain the terminuses of the pivots 92, 92d respectively within the pivot receptacles 124, 136.

The removal of the representative left-most splice tray 52d illustrated in FIG. 14 will now be described with reference to the representative front and rear left-most pivots 92, 92d illustrated in FIG. 14. The splice tray 52d is removed from the carrier assembly 75d by manually moving the splice tray forward to overcome the biasing forces of the buffer tubes 38 until the rear pivot 92d no longer extends into the rear pivot receptacle 136 (FIG. 8) of the splice tray. Thereafter, the rear end of the splice tray 52d is tilted upward and the entire splice tray is generally moved rearward and upward so that the front pivot 92 is withdrawn from the front pivot receptacle 124 (FIG. 6) of the splice tray.

The splice closures of the present invention advantageously contain multiple splice trays that can be individually pivoted and accessed so that the splice closures are capable of optimally carrying and providing access to numerous optical fibers and optical fiber splices.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A closure for containing optical fiber splices, the closure comprising:

a housing defining an internal cavity and at least one opening to the internal cavity;

an end cap capable of occluding the opening of the housing to provide an enclosed configuration;

a support frame having opposite front and rear ends, wherein the support frame extends in a longitudinal direction between the front and rear ends, the support frame defines a frame axis that extends in the longitudinal direction, the front end of the support frame is connected to the end cap, and the support frame is capable of being positioned within the internal cavity of the housing during the enclosed configuration; and a plurality of splice trays carried by the support frame, wherein each splice tray is capable of supporting at least one of the optical fiber splices, and each splice tray is mounted to be capable of pivoting relative to the support frame so that there are a plurality of axes of rotation that are generally parallel to the frame axis and about which the splice trays are respectively pivotable.

2. A closure according to claim 1, wherein a first group of the splice trays is spaced apart from a second group of the slice trays in a lateral direction that is generally perpendicular to the longitudinal direction so that a space is defined between the first and second groups of splice trays.

3. A closure according to claim 1, wherein the splice trays are adjacent and arranged so that external surfaces of the splice trays cooperate to define a cascade-like configuration.

4. A closure according to claim 1, wherein the housing has opposite front and rear ends, the opening is proximate the front end of the housing, the housing defines a housing axis extending between the front and rear ends of the housing, and the axes of rotation are generally parallel to the housing axis while the support frame is positioned within the internal cavity of the housing during the enclosed configuration.

5. A closure according to claim 1, further comprising:

a first pivot carried by the support frame and at least partially carrying a first of the splice trays; and a biasing mechanism operative:

for biasingly forcing the first splice tray in a first direction that extends generally in the longitudinal direction to maintain the first splice tray in the position in which the first splice tray is carried by the pivot and the pivot is carried by the support frame, and so that the bias force imposed by the biasing mechanism is overcome by forcing the first splice tray in a second direction that is opposite to the first direction so the first splice tray is moved in the second direction and out of the position in which the first splice tray is carried by the pivot and the pivot is carried by the support frame.

6. A closure according to claim 1, further comprising a plurality of pivots respectively extending generally coaxially with the axes of rotation and respectively carrying the splice trays.

7. A closure according to claim 6, wherein at least one of the pivots comprises a terminus and a biasing mechanism that biases the terminus generally in the longitudinal direction.

8. A closure according to claim 6, wherein the pivots are connected to the support frame and each of the splice trays defines at least one receptacle in receipt of at least one of the pivots.

9. A closure according to claim 6, wherein the pivots are respectively connected to the splice trays and the support frame defines a plurality of receptacles that are respectively in receipt of the pivots.

10. A closure according to claim 6, wherein the frame comprises a plurality of extensions that extend generally perpendicularly to the frame axis, and a first of the extensions carries a first group of the pivots and a second of the extensions carries a second group of the pivots.

11. A closure for containing optical fiber splices, the closure comprising:

a housing defining an internal cavity and at least one opening to the internal cavity;

an end cap capable of occluding the opening of the housing to provide an enclosed configuration;

a support frame connected to the end cap and capable of being positioned within the internal cavity of the housing during the enclosed configuration, wherein the support frame comprises:

a member having opposite front and rear ends, wherein the front end is closer to the end cap than the rear end, the member extends in a longitudinal direction between the front and rear ends, and the member defines a frame axis that extends in the longitudinal direction, a rear extension connected to and extending away from the member and extending generally in a lateral direction that is perpendicular to the longitudinal direction, and a front extension connected to and extending away from the member and extending generally in the lateral direction, wherein the front extension is in a position that is between the end cap and the rear extension; and a plurality of splice trays, wherein each splice tray is capable of supporting at least one of the optical fiber splices, each splice tray includes opposite front and rear ends, the front end of each splice tray is proximate the front extension, the rear end of each splice tray is proximate the rear extension, and each splice tray is pivotally carried by both the front and rear extensions.

12. A closure according to claim 11, wherein each splice tray comprises:

a front pivot proximate the front end of the splice tray and pivotally carried by the front extension; and a rear pivot proximate the rear end of the splice tray and pivotally carried by the rear extension.

13. A closure according to claim 11, wherein the member is a plate comprising an edge extending generally in the longitudinal direction, and the support frame further comprises a flange extending from proximate the edge for restricting the pivoting of at least one of the splice trays.

14. A closure according to claim 11, further comprising a restrictive mechanism operative for restricting the pivoting of at least one of the splice trays, wherein the restricting mechanism is selected from the group consisting of:

the combination of a protrusion carried by one of the splice trays that interacts with a receptacle carried by one of the extensions;

the combination of a protrusion carried by one of the extensions that interacts with a receptacle carried by one of the splice trays;

a stop protruding from at least one of the extensions and positioned for being abutted by at least one of the splice trays; and a stop protruding from the member and positioned for being abutted by at least one of the splice trays.

15. A closure according to claim 11, wherein:

the member further comprises opposite first and second sides extending in the longitudinal direction;

the front extension is a first front extension and is proximate the first side;

the rear extension is a first rear extension and is proximate the first side;

the splice trays are first splice trays;

the support frame further comprises:

a second rear extension connected to the member proximate the second side, wherein the second rear extension extends away from the member and generally in the lateral direction, and a second front extension connected to the member proximate the second side, wherein the second front extension extends away from the member and generally in the lateral direction; and the closure further comprises a plurality of second splice trays, wherein each of the second splice trays is capable of supporting at least one of the optical fiber splices, each second splice tray includes opposite front and rear ends, the front end of each second splice tray is proximate the second front extension, the rear end of each second splice tray is proximate the second rear extension, and each second splice tray is pivotally carried by both the second front extension and the second rear extension.

16. A closure according to claim 15, wherein:

the first front extension carries a plurality of first front pivots respectively pivotally carrying the first splice trays, wherein the first front pivots are arranged generally along a first front line;

the second front extension carries a plurality of second front pivots respectively pivotally carrying the second splice trays, wherein the second front pivots are arranged generally along a second front line that defines an angle with respect to the first front line;

the first rear extension carries a plurality of first rear pivots respectively pivotally carrying the first splice trays, wherein the first rear pivots are arranged generally along a first rear line; and the second rear extension carries a plurality of second rear pivots respectively pivotally carrying the second splice trays, wherein the second rear pivots are arranged generally along a second rear line that defines an angle with respect to the first rear line.

17. A closure according to claim 15, wherein the first splice trays are spaced apart from the second splice trays in the lateral direction so that a longitudinally extending space is defined between the plurality of first splice trays and the plurality of second splice trays.

18. A closure according to claim 17, wherein the support frame further comprises a generally U-shaped bracket mounted to the member and defining a longitudinally extending open channel that is contiguous with the space defined between the plurality of first splice trays and the plurality of second splice trays.

19. A closure for containing optical fiber splices, the closure comprising;

a housing defining an internal cavity and at least one opening to the internal cavity;

an end cap capable of occluding the opening of the housing to provide an enclosed configuration;

a support frame connected to the end cap and capable of being positioned within the internal cavity of the housing during the enclosed configuration;

a splice tray capable of supporting at least one of the optical fiber splices;

a pivot carried by the support frame and at least partially carrying the splice tray, wherein the pivot defines a povot axis that extends in a longitudinal direction and about which the splice tray is capable of pivoting; and a biasing mechanism operative:

for biasingly forcing the splice tray generally in a first direction that extends generally in the longitudinal direction to maintain the splice tray in the position in which the splice tray is carried by the pivot, and so that the bias force imposed by the biasing mechanism is selectively overcome by forcing the splice tray in a second direction that is generally opposite to the first direction so the splice tray is moved in the second direction and out of the position in which the splice tray is carried by the pivot that is carried by the support frame.

20. A closure according to claim 19, wherein:

the pivot is a first pivot; and the biasing mechanism comprises a second pivot carried by the support frame and at least partially carrying the splice tray, and the second pivot comprises a terminus and a spring that biases the terminus in the first direction.

21. A closure according to claim 19, wherein the biasing mechanism comprises a length of at least one of the components of a fiber optic cable, wherein the fiber optic cable extends through the end cap and the at least one of the components of the fiber optic cable extends to the splice tray.

22. A method for moving splice trays relative to a support frame, the method comprising:

moving a splice tray form a distant configuration to a proximate configuration such that the splice tray is distant from the support frame while in the distant configuration and the splice tray is proximate to the support frame while in the proximate configuration, wherein the support frame defines a longitudinal axis and the splice tray is at least partially carried by a pivot that defines a pivot axis parallel to the longitudinal axis defined by the support frame and that is carried by the support frame, and wherein the moving comprises moving the splice tray generally in a first direction so that the splice tray is moved into the proximate configuration; and biasingly forcing the splice tray in the first direction so that the splice tray is retained in the proximate configuration.

23. A method according to claim 22, further comprising overcoming the bias force to move the splice tray in a second direction that is generally opposite from the first direction so that the splice tray is removed from the proximate configuration.

24. A method according to claim 23, further comprising pivoting the splice tray about the pivot axis while the splice tray is in the proximate configuration.

\* \* \* \* \*

UNITED STATES PATENT AND TRADEMARK OFFICE
CERTIFICATE OF CORRECTION

PATENT NO. : 6,496,640 B1
DATED : December 17, 2002
INVENTOR(S) : John D. Harvey, Kelly J. Smith and James H. Wicker It is certified that error appears in the above-identified patent and that said Letters Patent is hereby corrected as shown below:

<u>Column 16,</u>
Line 56, delete "povot", and add -- pivot --.

Signed and Sealed this

Eighth Day of April, 2003

JAMES E. ROGAN
*Director of the United States Patent and Trademark Office*